(12) United States Patent
Binek et al.

(10) Patent No.: US 12,116,934 B2
(45) Date of Patent: Oct. 15, 2024

(54) TURBINE ENGINE FUEL INJECTOR WITH OXYGEN CIRCUIT

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/108,404

(22) Filed: Feb. 10, 2023

(65) Prior Publication Data
US 2024/0271568 A1    Aug. 15, 2024

(51) Int. Cl.
*F02C 7/22* (2006.01)
*F23R 3/28* (2006.01)

(52) U.S. Cl.
CPC .......... *F02C 7/22* (2013.01); *F23R 3/28* (2013.01); *F23D 2900/11001* (2013.01)

(58) Field of Classification Search
CPC ..... F02C 7/22; F02C 3/28; F02C 2900/11001
See application file for complete search history.

(56) References Cited

U.S. PATENT DOCUMENTS

| | | |
|---|---|---|
| 1,460,470 A | 7/1923 | Joseph |
| 2,385,833 A | 10/1945 | Nahigyan |
| 2,526,122 A * | 10/1950 | William .................... F23R 3/00 60/743 |
| 2,616,258 A | 11/1952 | Mock |
| 2,727,358 A | 12/1955 | Leslie |
| 3,053,461 A | 9/1962 | Inglis |
| 3,153,323 A | 10/1964 | Hamm |
| 3,430,443 A | 3/1969 | Frederick |
| 3,603,711 A | 9/1971 | Downs |
| 3,693,354 A | 9/1972 | Hull, Jr. |
| 3,693,889 A | 9/1972 | Schuster |
| 3,777,983 A | 12/1973 | Hibbins |
| 3,886,736 A | 6/1975 | Kawaguchi |
| 3,915,137 A | 10/1975 | Evans |
| 3,937,007 A | 2/1976 | Kappler |
| 4,028,044 A | 6/1977 | Carlisle |

(Continued)

FOREIGN PATENT DOCUMENTS

| | | |
|---|---|---|
| CN | 104712459 A | 6/2015 |
| CN | 115013839 A | 9/2022 |

(Continued)

OTHER PUBLICATIONS

EP Search Report for EP Patent Application No. 24157190.0 dated Jul. 1, 2024.

*Primary Examiner* — Lorne E Meade
(74) *Attorney, Agent, or Firm* — Getz Balich LLC

(57) ABSTRACT

A system is provided for an aerial vehicle. This system includes a splash plate, a fuel nozzle and a gas circuit. The splash plate includes a splash plate surface. The fuel nozzle includes a nozzle orifice. The fuel nozzle is configured to direct fuel out of the nozzle orifice to impinge against the splash plate surface. The gas circuit includes a gas passage and a gas outlet. At least a portion of the gas passage is formed by and embedded within the splash plate. The gas passage extends through the splash plate to the gas outlet.

14 Claims, 10 Drawing Sheets

(56) References Cited

U.S. PATENT DOCUMENTS

| | | | |
|---|---|---|---|
| 4,081,958 A | 4/1978 | Schelp | |
| 4,134,260 A | 1/1979 | Lefebvre | |
| 4,242,863 A | 1/1981 | Bailey | |
| 4,295,821 A | 10/1981 | Schilling | |
| 4,305,255 A | 12/1981 | Davies | |
| 4,653,278 A * | 3/1987 | Vinson | F23C 7/004 60/737 |
| 4,967,562 A | 11/1990 | Shekleton | |
| 4,967,563 A * | 11/1990 | Shekleton | F23R 3/045 60/743 |
| 4,989,404 A | 2/1991 | Shekleton | |
| 5,129,226 A | 7/1992 | Bigelow | |
| 5,133,192 A | 7/1992 | Overton | |
| 5,150,570 A * | 9/1992 | Shekleton | F23R 3/045 60/738 |
| 5,265,425 A * | 11/1993 | Howell | F23R 3/30 60/743 |
| 5,277,022 A | 1/1994 | Shekleton | |
| 5,321,951 A | 6/1994 | Falls | |
| 5,423,178 A | 6/1995 | Mains | |
| 5,568,721 A | 10/1996 | Alary | |
| 5,836,163 A | 11/1998 | Lockyer | |
| 5,873,237 A | 2/1999 | Medla | |
| 6,438,961 B2 | 8/2002 | Tuthill | |
| 6,460,344 B1 | 10/2002 | Steinthorsson | |
| 6,490,864 B1 | 12/2002 | Joos | |
| 6,672,066 B2 | 1/2004 | Wrubel | |
| 6,886,342 B2 * | 5/2005 | Alkabie | F23D 11/105 239/419 |
| 6,931,862 B2 | 8/2005 | Harris | |
| 6,986,253 B2 | 1/2006 | Leen | |
| 7,062,919 B2 * | 6/2006 | Alkabie | F23D 11/103 60/725 |
| 7,640,726 B2 | 1/2010 | Fang | |
| 7,870,736 B2 | 1/2011 | Homitz | |
| 7,891,191 B2 | 2/2011 | Yoshida | |
| 7,954,328 B2 | 6/2011 | Atassi | |
| 8,783,009 B2 | 7/2014 | Khosid | |
| 9,062,609 B2 | 6/2015 | Mehring | |
| 9,383,145 B2 | 7/2016 | Weber | |
| 9,803,498 B2 | 10/2017 | Jewess | |
| 10,139,108 B2 | 11/2018 | Thackway | |
| 10,570,865 B2 | 2/2020 | Zhang | |
| 10,619,855 B2 | 4/2020 | Brogan | |
| 10,739,005 B2 | 8/2020 | Kironn | |
| 11,008,977 B1 | 5/2021 | Markusic | |
| 11,649,964 B2 * | 5/2023 | Binek | F23D 14/58 60/740 |
| 2002/0069645 A1 | 6/2002 | Mowill | |
| 2006/0213180 A1 | 9/2006 | Koshoffer | |
| 2007/0044476 A1 | 3/2007 | Koshoffer | |
| 2008/0201008 A1 | 8/2008 | Twelves, Jr. | |
| 2009/0020266 A1 | 1/2009 | Weber | |
| 2009/0255264 A1 | 10/2009 | McMasters | |
| 2009/0260365 A1 | 10/2009 | Muldoon | |
| 2010/0050653 A1 | 3/2010 | Lam | |
| 2010/0281871 A1 | 11/2010 | Hadley | |
| 2011/0289928 A1 | 12/2011 | Fox | |
| 2011/0296839 A1 | 12/2011 | Van Nieuwenhuizen | |
| 2013/0098048 A1 | 4/2013 | Popovic | |
| 2016/0209041 A1 | 7/2016 | Twelves, Jr. | |
| 2020/0109663 A1 | 4/2020 | Binek | |
| 2022/0170636 A1 * | 6/2022 | Binek | F23R 3/28 |

FOREIGN PATENT DOCUMENTS

| | | |
|---|---|---|
| EP | 4008959 B1 | 1/2024 |
| EP | 4019839 B1 | 5/2024 |
| RU | 2165585 C1 | 4/2001 |

\* cited by examiner

TURBINE ENGINE FUEL INJECTOR WITH OXYGEN CIRCUIT

BACKGROUND OF THE DISCLOSURE

1. Technical Field

This disclosure relates generally to a turbine engine and, more particularly, to a fuel injector for the turbine engine.

2. Background Information

A combustor section in a modern turbine engine includes one or more fuel injectors. Each fuel injector is operable to inject fuel for combustion within a combustion chamber. Various types and configurations of fuel injectors are known in the art. While these known fuel injectors have various benefits, there is still room in the art for improvement. There is a need in the art, for example, for a fuel injector which can facilitate turbine engine start up a relatively high altitude.

SUMMARY OF THE DISCLOSURE

According to an aspect of the present disclosure, a system is provided for an aerial vehicle. This system includes a splash plate, a fuel nozzle and a gas circuit. The splash plate includes a splash plate surface. The fuel nozzle includes a nozzle orifice. The fuel nozzle is configured to direct fuel out of the nozzle orifice to impinge against the splash plate surface. The gas circuit includes a gas passage and a gas outlet. At least a portion of the gas passage is formed by and embedded within the splash plate. The gas passage extends through the splash plate to the gas outlet.

According to another aspect of the present disclosure, another system is provided for an aerial vehicle. This system includes a case wall, a fuel injector, a fuel circuit and a gas circuit. The case wall extends axially along and circumferentially about an axial centerline. The fuel injector is connected to and radially inboard of the case wall. The fuel circuit is configured to deliver fuel to the fuel injector. The fuel circuit includes a fuel supply passage integrated with the case wall. The fuel supply passage extends along the case wall circumferentially about the axial centerline. The gas circuit is configured to deliver oxygen gas to the fuel injector. The gas circuit includes a gas supply passage embedded within the case wall. The gas supply passage extends within the case wall circumferentially about the axial centerline.

According to still another aspect of the present disclosure, another system is provided for an aerial vehicle. This system includes an airframe body, a turbine engine, a gas circuit and an oxygen gas source. The airframe body includes an access port. The turbine engine is housed within the airframe body. The turbine engine includes a case wall and a fuel injector. The case wall includes a boss radially inboard of and overlapped by the access port. At least the airframe body and the case wall are configured together in a monolithic body. The fuel injector is radially inboard of the case wall. The gas circuit is configured to deliver oxygen gas to the fuel injector. The gas circuit includes a gas line fitting and a gas supply passage embedded within the case wall. The gas supply passage extends within the case wall circumferentially about an axial centerline of the turbine engine. The gas line fitting is bonded to the boss. The oxygen gas source is fluidly coupled to the gas supply passage through the gas line fitting.

The fuel injector may include a splash plate and a fuel nozzle. The fuel nozzle may include a nozzle orifice fluidly coupled with and downstream of the fuel supply passage. The fuel nozzle may be configured to direct the fuel out of the nozzle orifice to impinge against the splash plate. The gas circuit may also include a gas passage and a gas orifice in a surface of the splash plate. The gas passage may be fluidly coupled with and downstream of the gas supply passage. The gas passage may extend through the splash plate to the gas orifice.

The system may also include a second fuel injector connected to and radially inboard of the case wall. The fuel circuit may also be configured to deliver the fuel to the second fuel injector. The gas circuit may also be configured to deliver the oxygen gas to the second fuel injector.

The system may also include a monolithic body, and the monolithic body may include the case wall and the fuel injector.

The system may also include a gas source fluidly coupled with the gas circuit. The gas circuit may be configured to receive gas from the gas source. The gas passage may be configured to direct the gas to the gas outlet.

The gas source may be configured as or otherwise include a gas reservoir.

The gas received by the gas circuit from the gas source may be (e.g., consist of) oxygen gas.

The gas outlet may be located remote from the splash plate surface.

The splash plate may also include a second surface. The gas outlet may be disposed in the second surface.

The second surface may be adjacent the splash plate surface.

The gas circuit may be configured to direct gas out of the gas outlet downstream of the splash plate surface.

The gas circuit may be configured to direct gas out of the gas outlet along a trajectory angularly offset from the splash plate surface and away from the fuel impinging against the splash plate surface.

The system may also include an air tube including an air passage. The fuel nozzle may project into the air passage. The splash plate may be arranged within the air passage such that the splash plate is configured to direct at least some of the fuel against an inner sidewall surface of the air tube.

The gas circuit may be configured to direct gas out of the gas outlet into the air passage along a trajectory that is parallel with a centerline of the air tube or angularly offset from the centerline of the air tube by less than ten degrees.

The system may also include a combustor wall at least partially forming a combustion chamber. The air tube may be connected to the combustor wall and may project into the combustion chamber.

The system may also include a case wall and a support member. The fuel nozzle may be connected to and project inward from the case wall. The support member may be connected to and extend between the case wall and the fuel nozzle. The splash plate may be connected to the support member.

The support member may be configured as or otherwise include a strut.

Another portion of the gas passage may be formed by and embedded within the support member. The gas passage may extend though the support member from the case wall to the splash plate.

The system may also include a case wall extending axially along and circumferentially about an axial centerline. The gas circuit may also include a supply passage formed by and embedded within the case wall. The supply passage may extend circumferentially about the axial centerline. The gas passage may be fluidly coupled with and downstream of the supply passage.

The case wall may include a boss. The gas circuit may also include a gas line fitting bonded to the boss. The supply passage may be fluidly coupled with and downstream of the gas line fitting.

The system may also include an airframe body and a turbine engine. The airframe body includes an access port. The turbine engine may be housed within the airframe body. The turbine engine may include the splash plate, the fuel nozzle and the case wall. The access port may be radially outboard of and overlap the boss and the gas line fitting.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
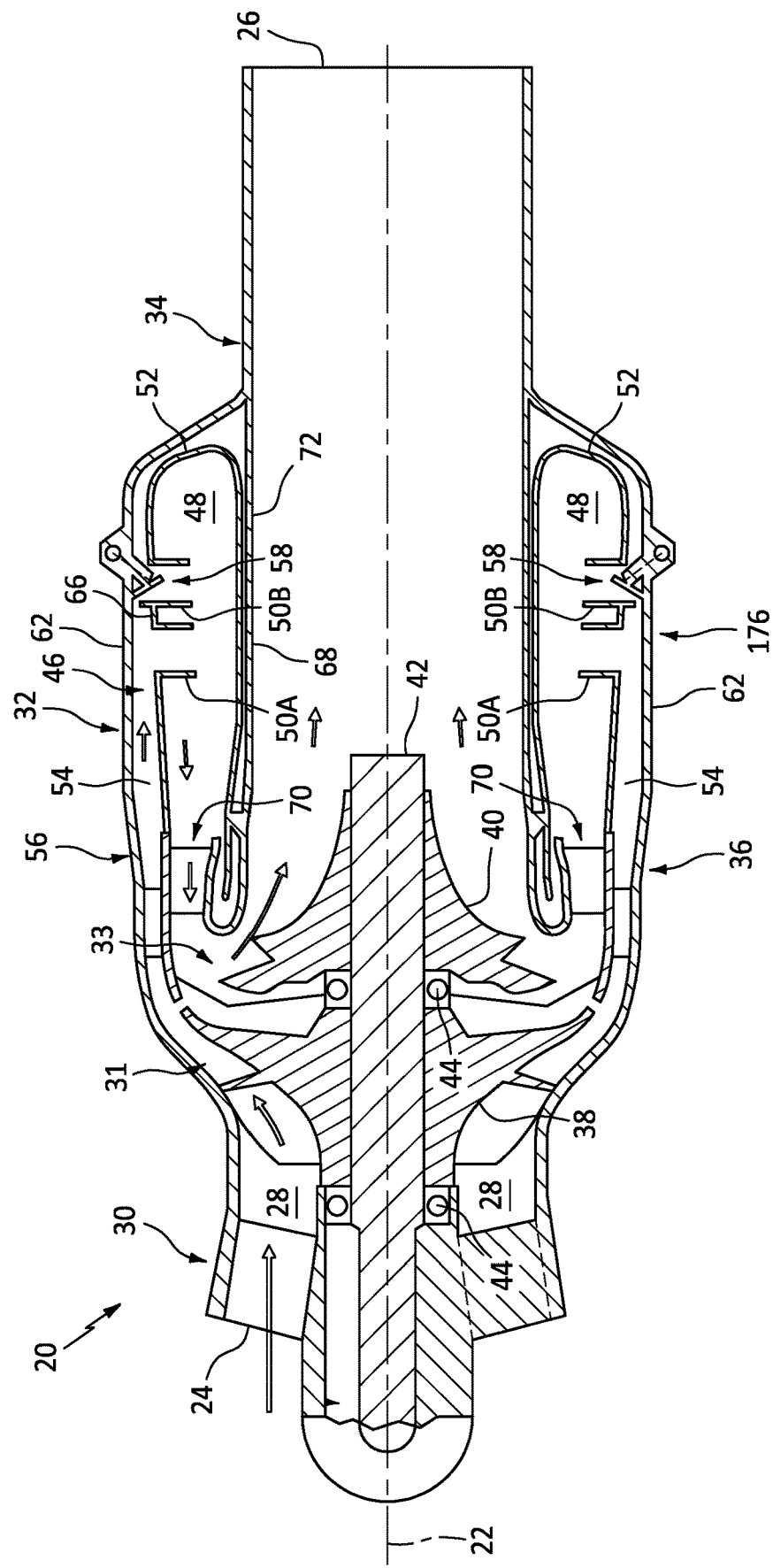
FIG. 1 is a schematic side sectional illustration of a turbine engine for an aerial vehicle.

FIG. 1 illustrates a gas turbine engine 20 for an aerial vehicle such as, but not limited to, an unmanned aerial vehicle (UAV), a drone or any other manned or unmanned aircraft or self-propelled projectile. The turbine engine 20 of FIG. 1 is configured as a single spool, radial-flow turbojet gas turbine engine. This turbine engine 20 is configured for propelling the aerial vehicle during flight. The present disclosure, however, is not limited to such an exemplary turbojet gas turbine engine configuration nor to a vehicle propulsion system application. For example, the turbine engine 20 may alternatively be configured as an auxiliary power unit (APU) for the aerial vehicle.

The turbine engine 20 of FIG. 1 extends axially along an axial centerline 22 between a forward, upstream airflow inlet 24 into the turbine engine 20 and an aft, downstream exhaust 26 out of the turbine engine 20. This axial centerline 22 may be a centerline axis of the turbine engine 20. The axial centerline 22 may also or alternatively be a rotational axis for one or more components within the turbine engine 20.

The turbine engine 20 includes a core flowpath 28, an inlet section 30, a (e.g., radial flow) compressor section 31, a (e.g., reverse flow) combustor section 32, a (e.g., radial flow) turbine section 33 and an exhaust section 34. The turbine engine 20 also includes a static engine structure 36 housing and/or forming one or more or all of the engine sections 30-34.

The core flowpath 28 extends within the turbine engine 20 between the engine inlet 24 and the engine exhaust 26. More particularly, the core flowpath 28 extends sequentially through the inlet section 30, the compressor section 31, the combustor section 32, the turbine section 33 and the exhaust section 34 from the engine inlet 24 to the engine exhaust 26.

The compressor section 31 includes a bladed compressor rotor 38. The turbine section 33 includes a bladed turbine rotor 40. Each of these engine rotors 38, 40 includes a plurality of rotor blades arranged circumferentially around and connected to at least one respective rotor disk and/or hub. The rotor blades, for example, may be formed integral with or mechanically fastened, welded, brazed, adhered and/or otherwise attached to the respective rotor disk(s) and/or hub(s).

The compressor rotor 38 may be configured as a radial flow compressor rotor. The turbine rotor 40 may be configured as a radial flow turbine rotor. The compressor rotor 38 is connected to the turbine rotor 40 through an engine shaft 42. This engine shaft 42 is rotatably supported by the static engine structure 36 through a plurality of bearings 44; e.g., rolling element bearings, journal bearings, etc.

The combustor section 32 includes an annular combustor 46 with an annular combustion chamber 48. The combustor 46 of FIG. 1 is configured as a reverse flow combustor. Air tubes 50A and 50B (generally referred to as "50") (e.g., dilution chutes, flow tubes, etc.) into the combustion chamber 48, for example, may be arranged at (e.g., on, adjacent or proximate) and/or towards an aft bulkhead wall 52 of the combustor 46. An outlet from the combustor 46 may be arranged axially aft of an inlet to the turbine section 33. The combustor 46 may also be arranged radially outboard of and/or axially overlap at least a portion (e.g., aft portion) of the turbine section 33. With this arrangement, the core flowpath 28 of FIG. 1 reverses direction (e.g., from a forward-to-aft direction to an aft-to-forward direction) a first time as the core flowpath 28 extends from a diffuser plenum 54 surrounding the combustor 46 into the combustion chamber 48. The core flowpath 28 of FIG. 1 then reverses its direction (e.g., from the aft-to-forward direction to the forward-to-aft direction) a second time as the core flowpath 28 extends from the combustion chamber 48 into the turbine section 33.

During operation, air enters the turbine engine 20 through the inlet section 30 and its engine inlet 24. The inlet section 30 directs this air from the engine inlet 24 into the core flowpath 28 and the compressor section 31. The air within the core flowpath 28 may be referred to as core air. This core air is compressed by the compressor rotor 38 and directed through a diffuser 56 and its diffuser plenum 54 into the combustion chamber 48. Fuel is injected via one or more fuel injectors 58 and mixed with the compressed core air to provide a fuel-air mixture. This fuel-air mixture is ignited within the combustion chamber 48, and combustion products thereof flow through the turbine section 33 and cause the turbine rotor 40 to rotate. The rotation of the turbine rotor 40 drives rotation of the compressor rotor 38 and, thus, compression of the air received from the engine inlet 24. The exhaust section 34 receives the combustion products from the turbine section 33. The exhaust section 34 directs the received combustion products out of the turbine engine 20 to provide, for example, forward engine thrust.

Figure 2:
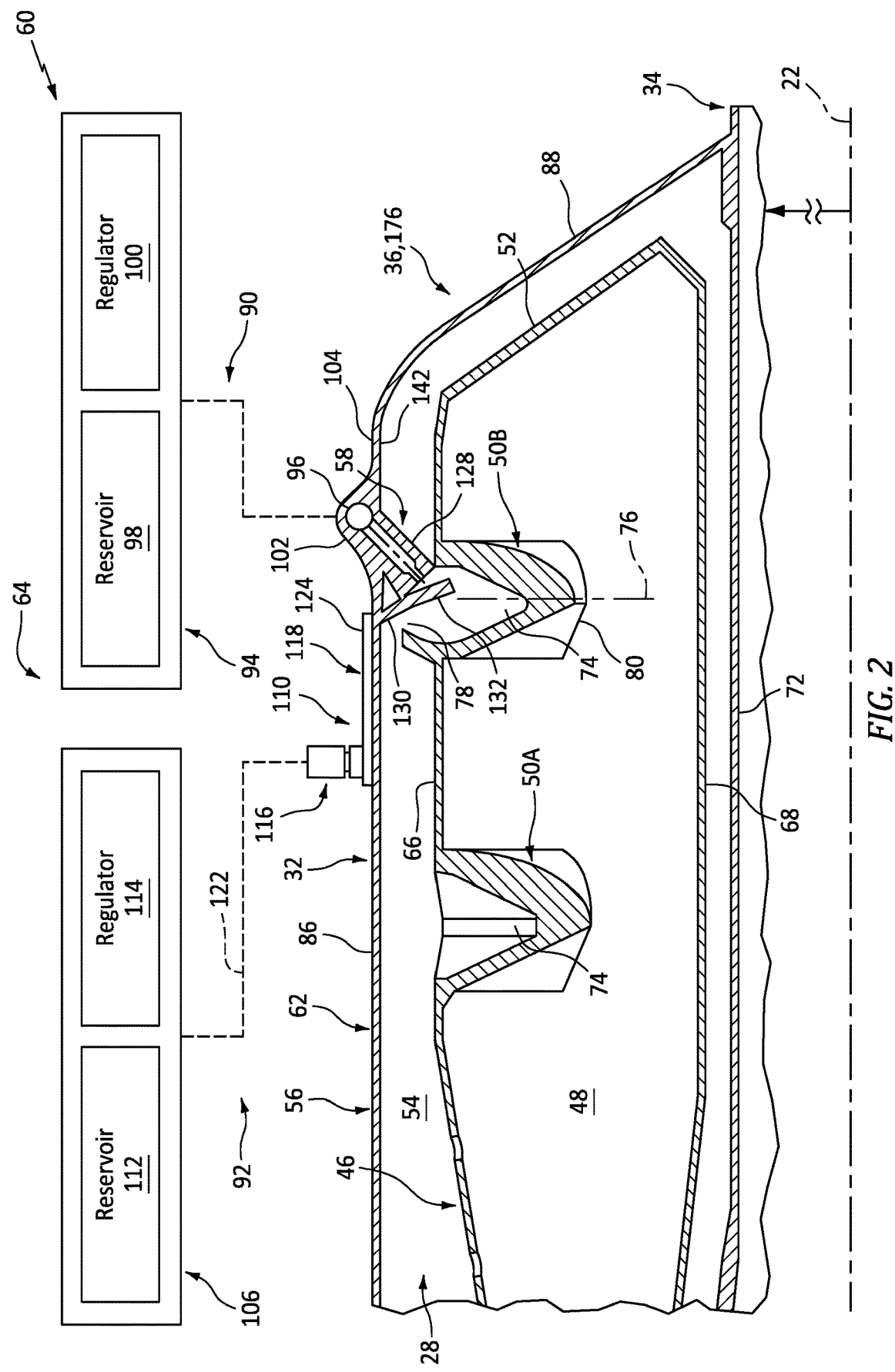
FIG. 2 is a partial schematic illustration of a system for the aerial vehicle.

FIG. 2 illustrates a portion of a system 60 for the aerial vehicle. This vehicle system 60 includes at least a portion of the static engine structure 36 within/forming the combustor section 32. The static engine structure 36 includes the combustor 46 and a case wall 62 surrounding the combustor 46. The vehicle system 60 also includes a fuel and gas injection system 64.

The combustor 46 of FIG. 2 includes an outer combustor wall 66, an inner combustor wall 68 and the bulkhead wall 52. The outer combustor wall 66 extends axially along the axial centerline 22 between and may be connected to an outer platform of a turbine nozzle 70 (see FIG. 1) and the bulkhead wall 52. The outer combustor wall 66 extends circumferentially about (e.g., circumscribes), axially overlaps and is spaced radially outward from the inner combustor wall 68. The inner combustor wall 68 extends axially between an inner platform of the turbine nozzle 70 (see FIG. 1) and the bulkhead wall 52, and the inner combustor wall 68 may be connected to the bulkhead wall 52. The inner combustor wall 68 extends circumferentially about (e.g., circumscribes), axially overlaps and is spaced radially outward from a turbine case 72 (see also FIG. 1). The bulkhead wall 52 extends radially between the outer combustor wall 66 and the inner combustor wall 68, at aft ends of the combustor walls 66 and 68. With this arrangement, the combustor walls 52, 66 and 68 collectively form peripheral boundaries of the combustion chamber 48 within the combustor 46.

Figure 3:
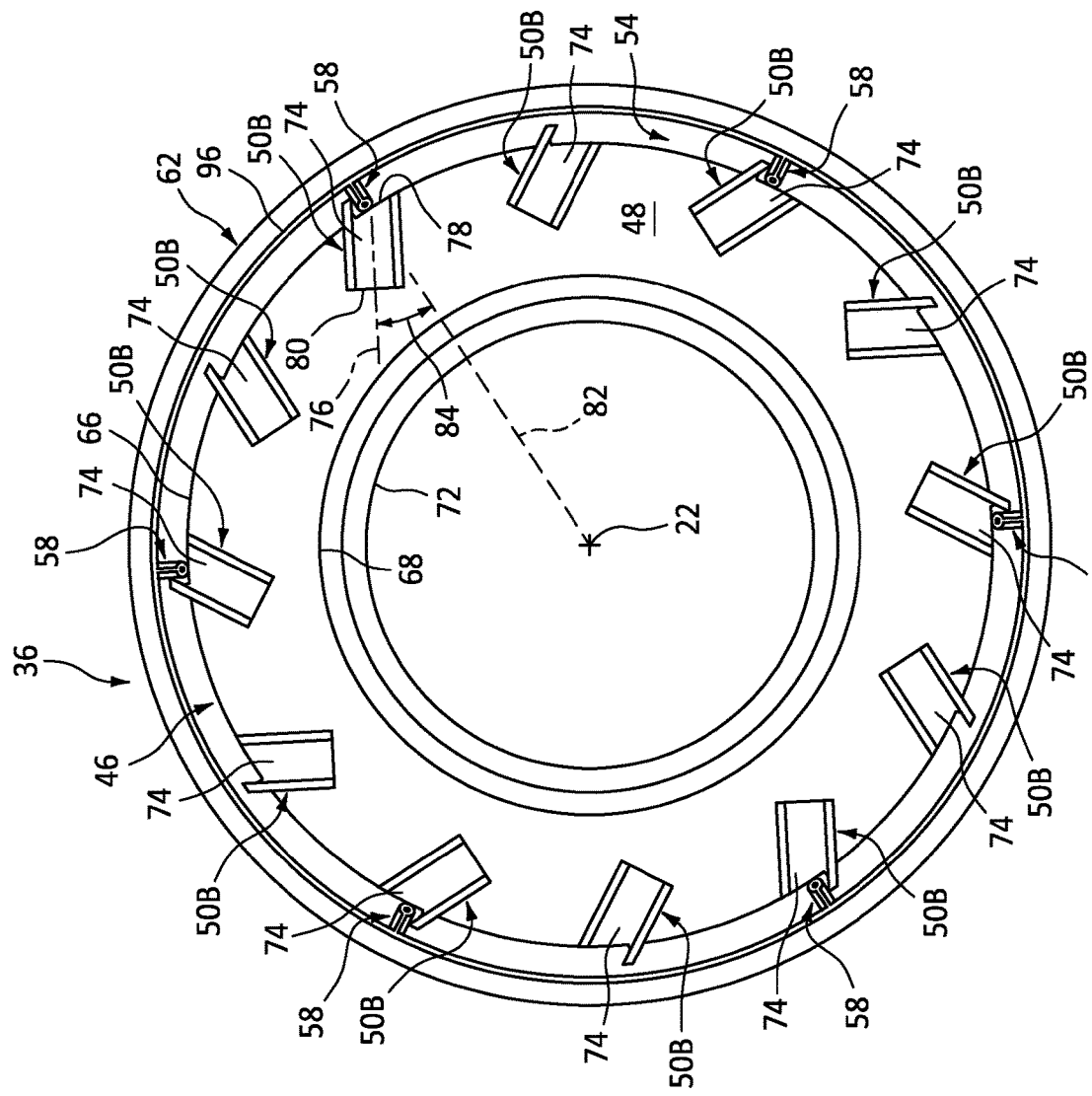
FIG. 3 is a cross-sectional illustration through a turbine engine.

The combustor 46 of FIG. 2 also includes one or more sets of the air tubes 50. Referring to FIG. 3, the air tubes 50 in each set are arranged circumferentially about the axial centerline 22 in a circular array. Referring to FIG. 2, each of the air tubes 50 is connected to (e.g., formed integral with or otherwise attached to) the outer combustor wall 66. Each of the air tubes 50 projects radially inward from the outer combustor wall 66 partially into the combustion chamber 48 to a distal inner end of the respective air tube 50. Each air tube 50 has an internal air passage 74; e.g., an inner bore of the respective air tube 50. This air passage 74 extends longitudinally along a longitudinal centerline 76 of the respective air tube 50 and/or the respective air passage 74 through the air tube 50. More particularly, the air passage 74 extends longitudinally from an inlet 78 into the air passage 74 to an outlet 80 from the air passage 74. The air passage inlet 78 of FIG. 2 is disposed at an outer end of the respective air tube 50. The air passage outlet 80 of FIG. 2 is disposed at the inner end of the respective air tube 50. With this arrangement, each air tube 50 and its air passage 74 fluidly couples the diffuser plenum 54 outside of the combustor 46 and radially outboard of the outer combustor wall 66 with the combustion chamber 48 inside of the combustor 46 and radially inboard of the outer combustor wall 66.

When viewed in a first reference plane parallel with (e.g., that includes) the axial centerline 22 (e.g., plane of FIG. 2), each longitudinal centerline 76 may be perpendicular to the axial centerline 22, or angularly offset from the axial centerline 22 by less than ten degrees (10°) or five degrees (5°). When viewed in a second reference plane perpendicular to the axial centerline 22 (e.g., plane of FIG. 3), each longitudinal centerline 76 may be angularly offset from a reference line 82 by an angle 84. The reference line 82 may be a ray projecting radially out from the axial centerline 22 to (e.g., a center of) the air passage inlet 78 associated with the respective longitudinal centerline 76. The angle 84 may be a (e.g., non-zero) acute angle between, for example, ten degrees (10°) and forty-five degrees (45°). The present disclosure, however, is not limited to the foregoing exemplary air tube/air passage configurations. The air tubes 50, for example, may be alternatively arranged to tailor combustion dynamics within the combustion chamber 48.

Referring to FIG. 2, the case wall 62 may be configured as an outer case of the diffuser 56; e.g., an outer diffuser case. The case wall 62 of FIG. 2, for example, is configured to at least partially house the combustor 46 within the combustor section 32. The case wall 62 of FIG. 2, in particular, includes a sidewall section 86 and an endwall section 88. The case wall 62 and its sidewall section 86 extend circumferentially about (e.g., circumscribe), axially overlap and are spaced radially outward from the combustor 46 and its outer combustor wall 66. The case wall 62 may thereby form an outer peripheral boundary of the core flowpath 28 and the diffuser plenum 54 along the combustor 46. The case wall 62 and its endwall section 88 extend radially inwards from an aft, downstream end of the sidewall section 86 to the turbine case 72 (see also FIG. 1). The case wall 62 and its endwall section 88 thereby radially overlap and are spaced axially aft from the combustor 46 and its bulkhead wall 52.

The fuel and gas injection system 64 includes a fuel delivery system 90 and a (e.g., oxygen ($O_2$)) gas delivery system 92. The fuel and gas injection system 64 also includes the one or more fuel injectors 58, where each fuel injector 58 receives fuel from the fuel delivery system 90 and each fuel injector 58 may receive (e.g., oxygen ($O_2$)) gas from the gas delivery system 92.

The fuel delivery system 90 includes a fuel source 94 and a fuel supply passage 96. The fuel source 94 is configured to contain fuel before, during and/or after turbine engine operation. The fuel source 94 is also configured to deliver the fuel to the fuel supply passage 96 to facilitate turbine engine operation. The fuel source 94, for example, may be configured as or otherwise include a fuel reservoir 98 and/or a fuel regulator 100. Examples of the fuel reservoir 98 include, but are not limited to, a container, a tank, a pressure vessel and a bladder. Examples of the fuel regulator 100 include, but are not limited to, a pump and a valve system. The fuel regulator 100 may flow, pump and/or otherwise direct fuel received from the fuel reservoir 98 (and/or elsewhere) to the fuel supply passage 96. The fuel may be a hydrocarbon fuel such as, but not limited to, kerosene or jet fuel. It is contemplated, however, that the fuel may alternatively be a non-hydrocarbon fuel such as, but not limited to ammonia or hydrogen.

Figure 4:
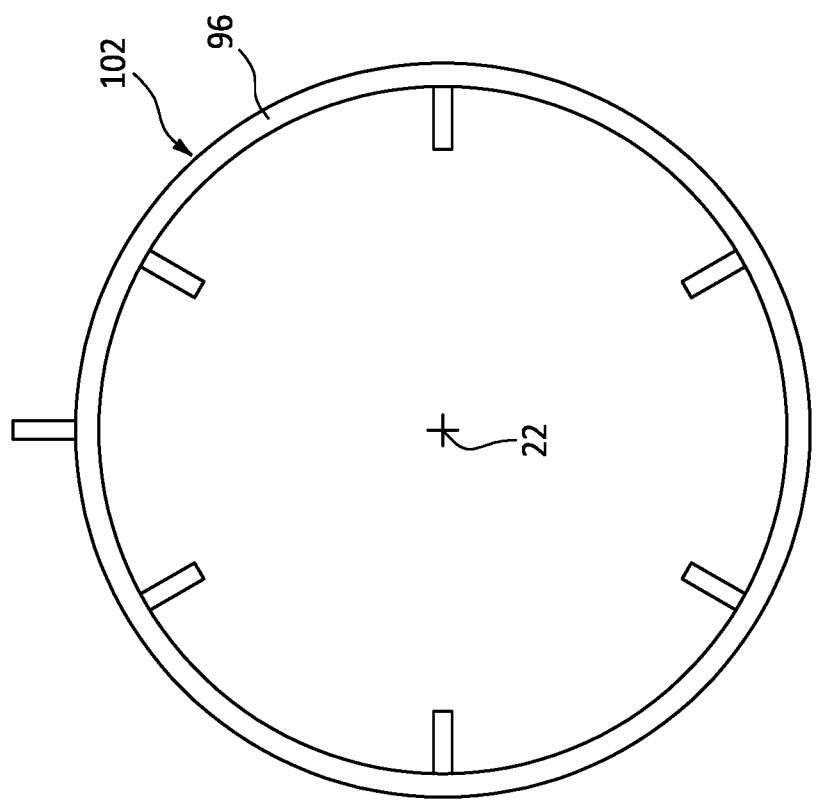
FIG. 4 is a schematic illustration of a portion of a fuel circuit with an annular fuel supply passage.

The fuel supply passage 96 may be configured in, or included as part of, a fuel supply tube and/or a fuel manifold for one or more or all of the fuel injectors 58. The fuel supply passage 96 of FIG. 2, for example, is formed by a conduit 102. This fuel supply conduit 102 is arranged at an outer side 104 of the case wall 62. The fuel supply conduit 102 may be formed integral with (or otherwise attached to) the case wall 62. Referring to FIG. 4, the fuel supply conduit 102 and its fuel supply passage 96 extend circumferentially about (e.g., completely around) the axial centerline 22. With such a configuration, the fuel supply passage 96 may have a full-hoop (e.g., annular) geometry. The fuel supply conduit 102 and its fuel supply passage 96, however, may alternatively extend partially circumferentially about the axial centerline 22. Furthermore, while the fuel supply conduit 102 is shown as a protrusion out from the case wall 62 in FIG. 2, it is contemplated the fuel supply passage 96 may alternatively be formed by and embedded within the case wall 62.

Figure 5:
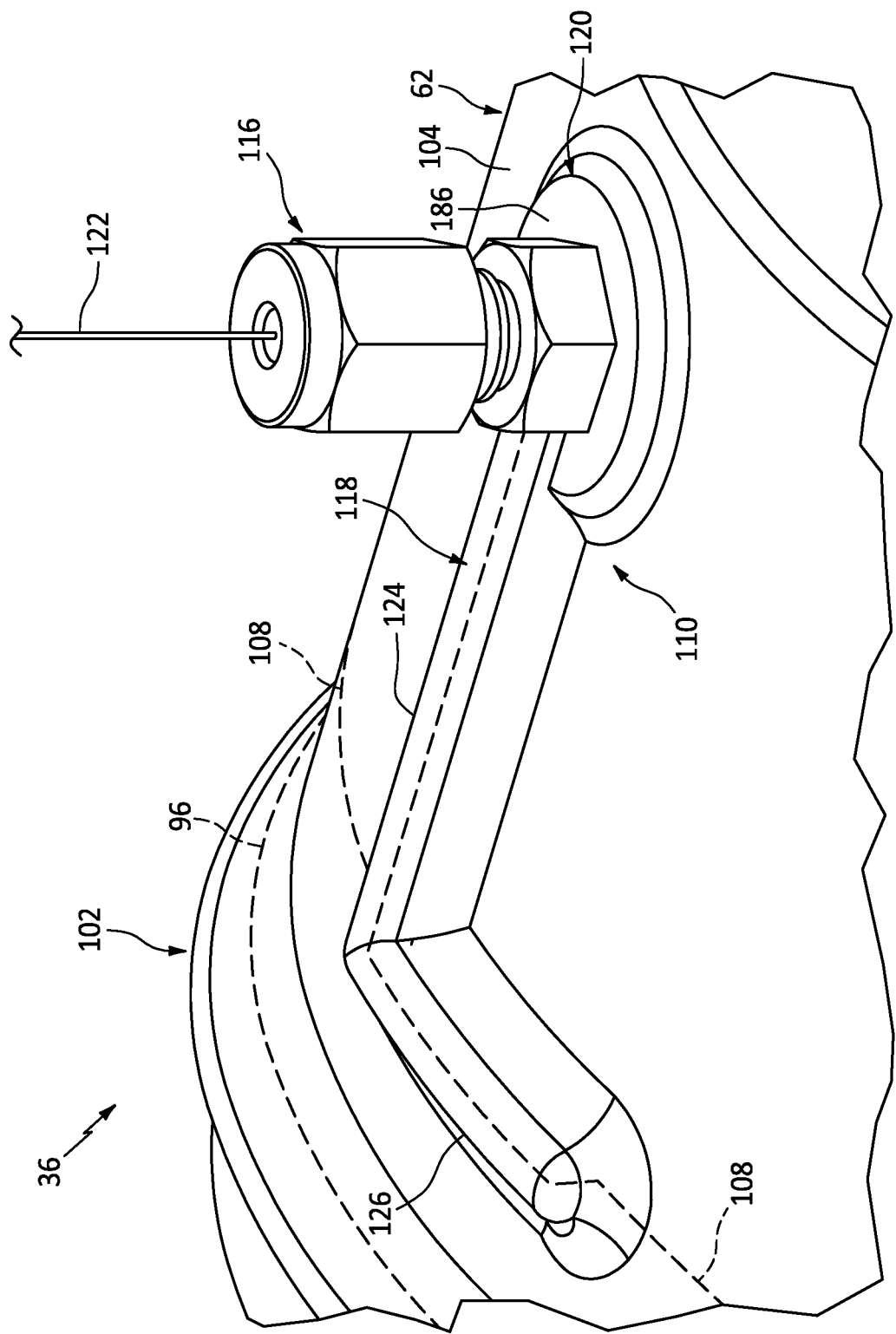
FIG. 5 is a partial perspective illustration of a turbine engine at a gas line fitting.

The gas delivery system 92 of FIG. 2 includes a (e.g., oxygen ($O_2$)) gas source 106 and a (e.g., oxygen ($O_2$)) gas supply passage 108 (see FIG. 5). The gas delivery system 92 may also include an intermediate coupler 110 (see FIG. 5) between the gas source 106 and the gas supply passage 108.

The gas source 106 is configured to contain pressurized gas (e.g., pressurized oxygen ($O_2$) or pressurized air) before, during and/or after turbine engine operation. The gas source 106 is also configured to deliver the gas to the gas supply passage 108 to facilitate turbine engine operation. The gas source 106, for example, may be configured as or otherwise include a gas reservoir 112 and/or a gas regulator 114. Examples of the gas reservoir 112 include, but are not limited to, a container, a tank, a pressure vessel and a bladder. An example of the gas regulator 114 is, but is not limited to, a valve system. The gas regulator 114 may selectively flow and/or otherwise direct the gas received from the gas reservoir 112 (and/or elsewhere) to the gas supply passage 108.

Figure 6:
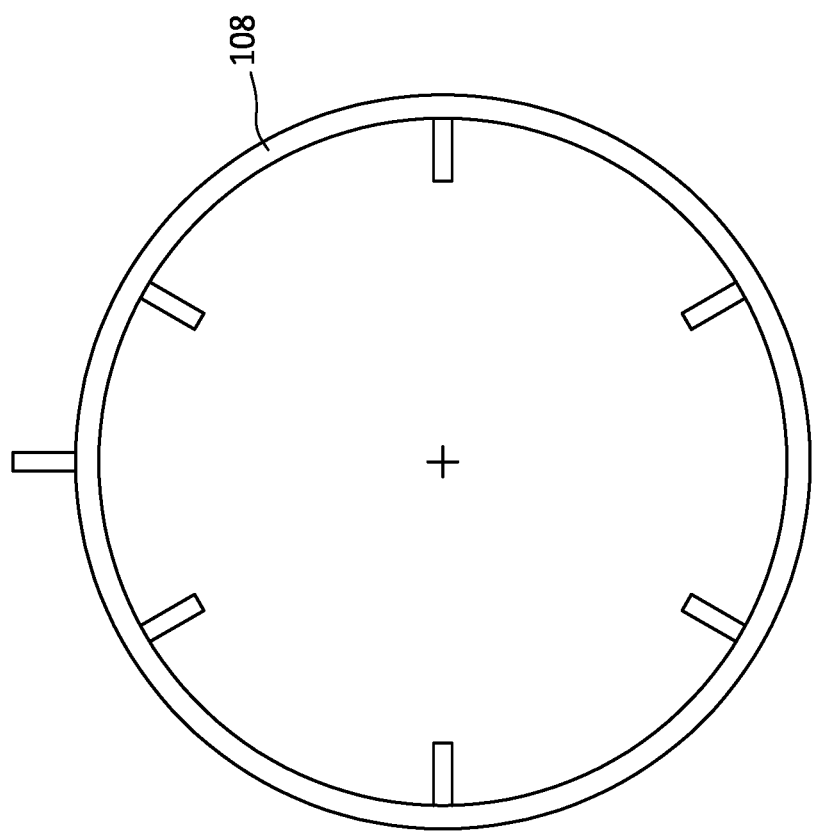
FIG. 6 is a schematic illustration of a portion of a gas circuit with an annular gas supply passage.

Referring to FIG. 5, the gas supply passage 108 may be configured in, or included as part of, a gas supply tube and/or a gas manifold for one or more or all of the fuel injectors 58. The gas supply passage 108 of FIG. 5 may be formed by and embedded within the case wall 62; see also FIG. 7. Referring to FIG. 6, the gas supply passage 108 extends circumferentially about (e.g., completely around) the axial centerline 22. With such a configuration, the gas supply passage 108 may have a full-hoop (e.g., annular) geometry. The gas supply passage 108, however, may alternatively extend partially circumferentially about the axial centerline 22. Furthermore, while the gas supply passage 108 is shown as being embedded within the case wall 62 of FIG. 2, it is contemplated that some or all of the gas supply passage 108 may alternatively be formed by a conduit integrated with or otherwise attached to the case wall 62.

Referring to FIG. 5, the intermediate coupler 110 may include a gas line fitting 116 and a conduit 118. The gas line fitting 116 is attached to the case wall 62. The gas line fitting 116 of FIG. 5, for example, is bonded (e.g., welded or brazed) to a mounting boss 120 on the outer side 104 of the case wall 62. The gas line fitting 116 provides an interface for mounting a gas line 122 to the intermediate coupler 110. By attaching the gas line fitting 116 to the mounting boss 120, machining operations to the static engine structure 36 may be reduced. For example, rather than tapping a bore of the mounting boss 120 to receive an end of the gas line 122, the gas line fitting 116 is provided to mate with the gas line 122. This may be particularly useful where at least a portion of the static engine structure 36 which includes the case wall 62 is formed via additive manufacturing and, thus, it may be difficult to remove machining debris from internal passages.

The coupler conduit 118 of FIG. 5 includes an upstream (e.g., axial) section 124 and a downstream (e.g., circumferential) section 126. This coupler conduit 118 is arranged at the outer side 104 of the case wall 62. The coupler conduit 118 may be formed integral with (or otherwise attached to) the case wall 62. The upstream section 124 of the coupler conduit 118 extends axially along the case wall 62 from the mounting boss 120 to the downstream section 126 of the coupler conduit 118. The downstream section 126 of the coupler conduit 118 extends circumferentially along the case wall 62 from the upstream section 124 of the coupler conduit 118 to an intersection with the gas supply passage 108.

With the foregoing configuration, the intermediate coupler 110 and a passage therethrough may fluidly couple the gas source 106 (see FIG. 2) to the gas supply passage 108. In particular, the gas line fitting 116 fluidly couples the gas line 122 and, thus, the gas source 106 (see FIG. 2) to the coupler conduit 118. The coupler conduit 118 in turn fluidly couples the gas line fitting 116 to the gas supply passage 108. However, it is contemplated the some or all of the coupler conduit 118 may be omitted. For example, the downstream section 126 of the coupler conduit 118 may be omitted where the gas supply passage 108 interfaces with an end of the upstream section 124 of the coupler conduit 118. In another example, the entire coupler conduit 118 may be omitted where the gas supply passage 108 interfaces with the gas line fitting 116 through the bore of the mounting boss 120.

Referring to FIG. 3, the fuel injectors 58 are arranged circumferentially about the axial centerline 22 in a circular array. Each fuel injector 58 may be arranged with a respective one of the air tubes 50B as described below in further detail. While the fuel injectors 58 are illustrated as being arranged with every-other air tube 50B in air tube set of FIG. 3, the present disclosure is not limited to such an exemplary embodiment. The fuel injectors 58, for example, may alternatively be arranged with every air tube 50B in a respective air tube set, with every second or third air tube 50B in a respective air tube set, etc.

Figure 7:
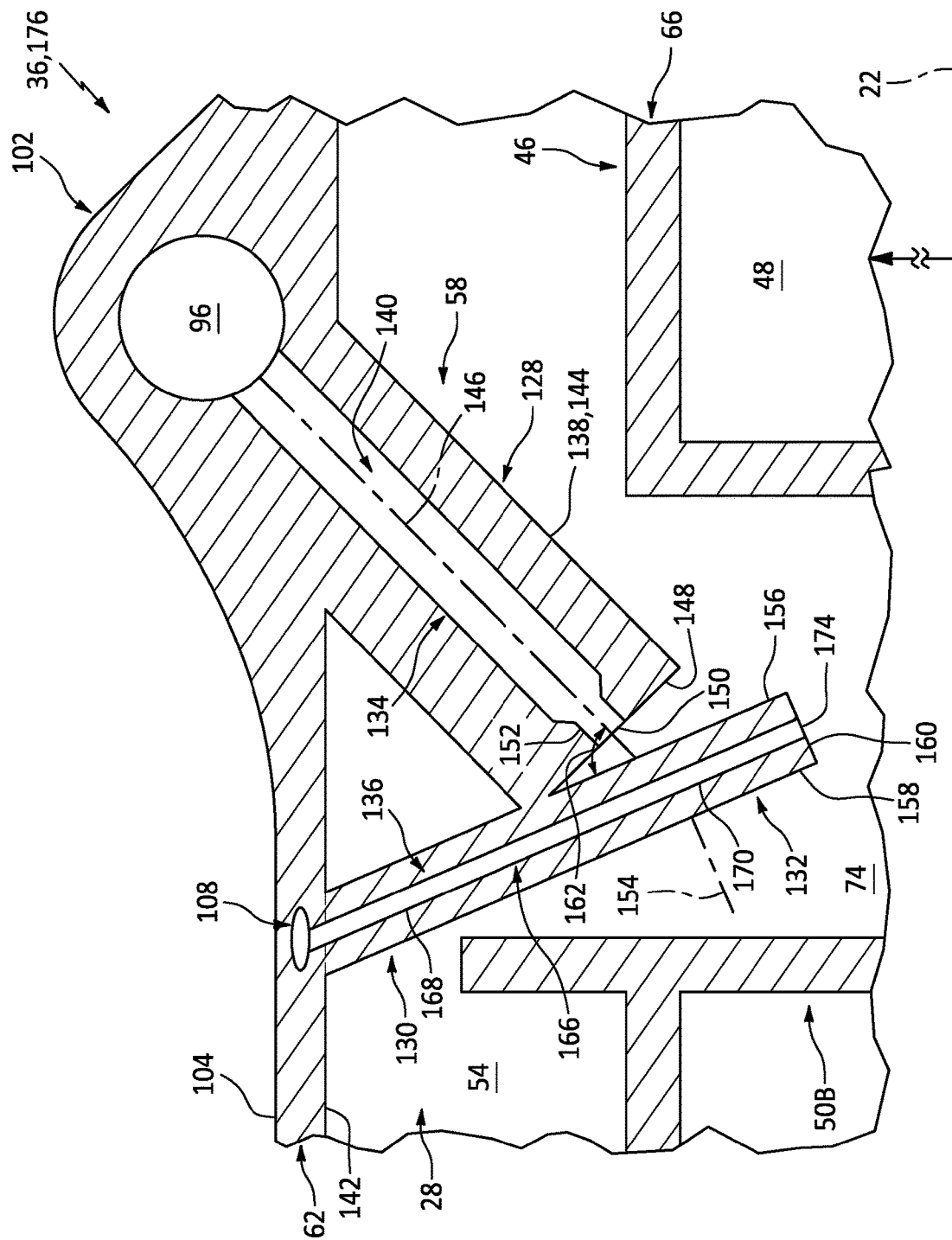
FIG. 7 is a partial sectional illustration of a turbine engine at a fuel injector.

Referring to FIG. 7, each fuel injector 58 includes a fuel nozzle 128, a support member 130 (e.g., a strut, a frame, a web, etc.) and a splash plate 132. Each fuel injector 58 is configured with a fuel circuit 134 and a (e.g., oxygen (02)) gas circuit 136.

The fuel nozzle 128 is configured to receive the fuel from the fuel supply passage 96. The fuel nozzle 128 is also configured to inject the received fuel into a respective one of the air passages 74 to impinge against the splash plate 132. The fuel nozzle 128 of FIG. 7 includes a nozzle body 138 and a nozzle passage 140; e.g., a fuel passage.

The nozzle body 138 is arranged at and/or is connected to an inner side 142 of the case wall 62, where the wall inner side 142 is opposite the wall outer side 104. The nozzle body 138 of FIG. 7 is configured as or may otherwise include a nozzle tube 144. A base end of the nozzle tube 144 is connected to (e.g., formed integral with or otherwise attached to) the case wall 62. The nozzle tube 144 projects (e.g., radially and/or axially) out from the case wall 62 along a (e.g., straight or curved) longitudinal centerline 146 of the nozzle passage 140 and/or the nozzle tube 144 to an inner distal end 148 of the fuel nozzle 128.

An internal bore of the nozzle tube 144 at least partially (or completely) forms the nozzle passage 140. The nozzle passage 140 extends longitudinally along the longitudinal centerline 146 within and/or through the case wall 62 and the nozzle tube 144 from the fuel supply passage 96 to a downstream nozzle orifice 150 at the fuel nozzle distal end 148. This nozzle orifice 150 provides an outlet from the nozzle passage 140 and, more generally, the fuel nozzle 128.

The support member 130 extends (e.g., radially and/or axially) between the case wall 62 and a side of the nozzle tube 144. The support member 130 is connected to (e.g., formed integral with or otherwise attached to) the case wall 62 and the nozzle tube 144. The support member 130 may thereby structurally tie the nozzle tube 144 to the case wall 62 and support the nozzle tube 144 within the diffuser plenum 54 and/or the respective air passage 74. The support member 130, for example, may form a support brace for the nozzle tube 144. The support member 130 may also provide a support for the nozzle tube 144 while forming (e.g., additively manufacturing) the fuel nozzle 128.

Figure 8:
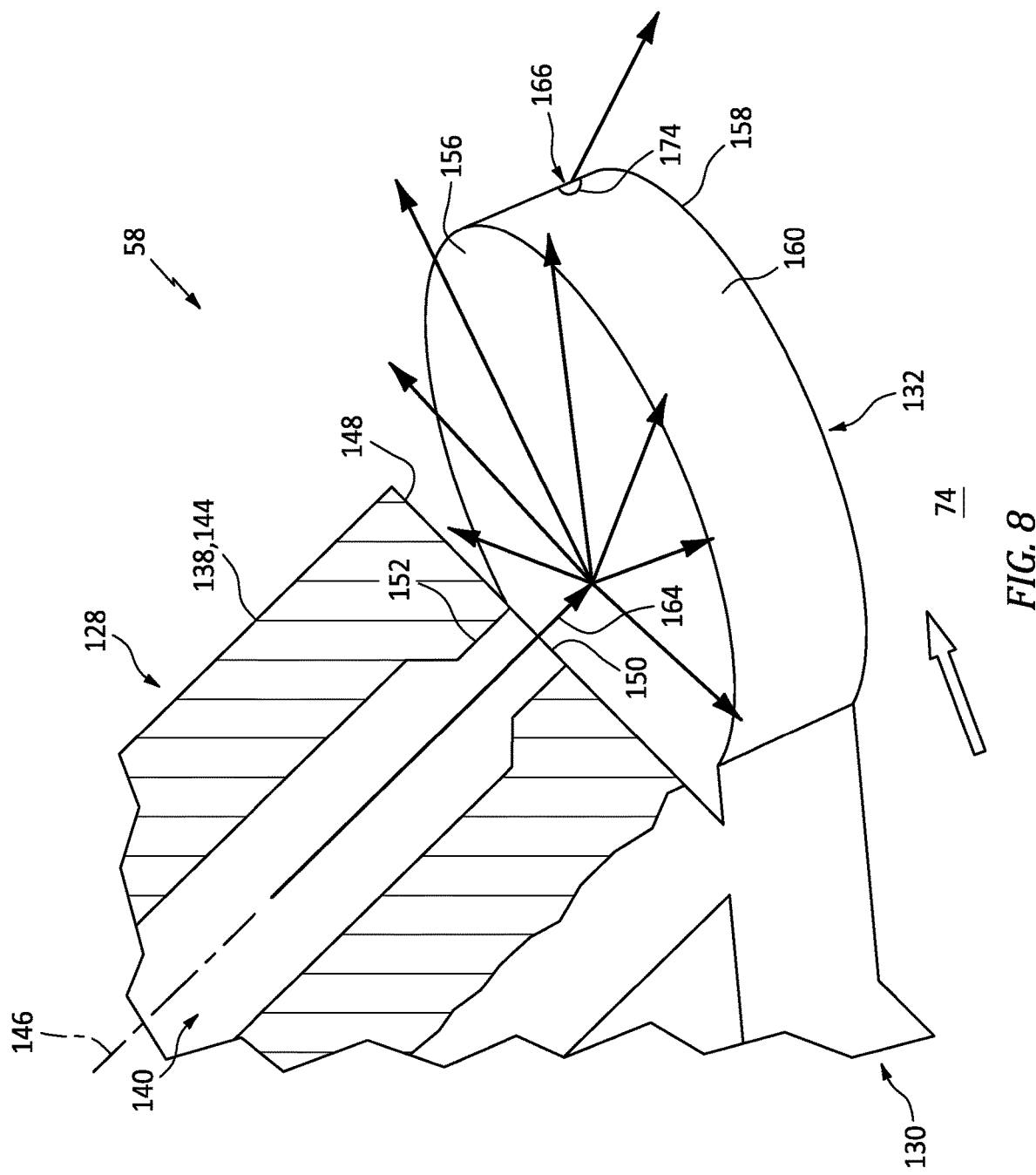
FIG. 8 is a side cutaway illustration of a portion of the fuel injector of FIG. 7 schematically depicting various fluid flows during engine operation.

The splash plate 132 is configured to redirect (e.g., disperse) the fuel injected into the air passage 74 from the fuel nozzle 128 into a widespread pattern (e.g., see FIG. 8). The splash plate 132, for example, is arranged proximate and laterally overlaps the nozzle orifice 150. The splash plate 132 is longitudinally spaced from the fuel nozzle 128 and its nozzle orifice 150 by a longitudinal distance along the longitudinal centerline 146. This longitudinal distance may be equal to or different (e.g., greater or less) than a width (e.g., diameter) of the nozzle passage 140. The longitudinal distance of FIG. 7, for example, is between one-half times (0.5×) and five times (5×) a width (e.g., a diameter) of a throat portion 152 of the nozzle passage 140. The present disclosure, however, is not limited to the foregoing exemplary dimensional relationship between the splash plate 132 and the fuel nozzle 128.

Figure 9:
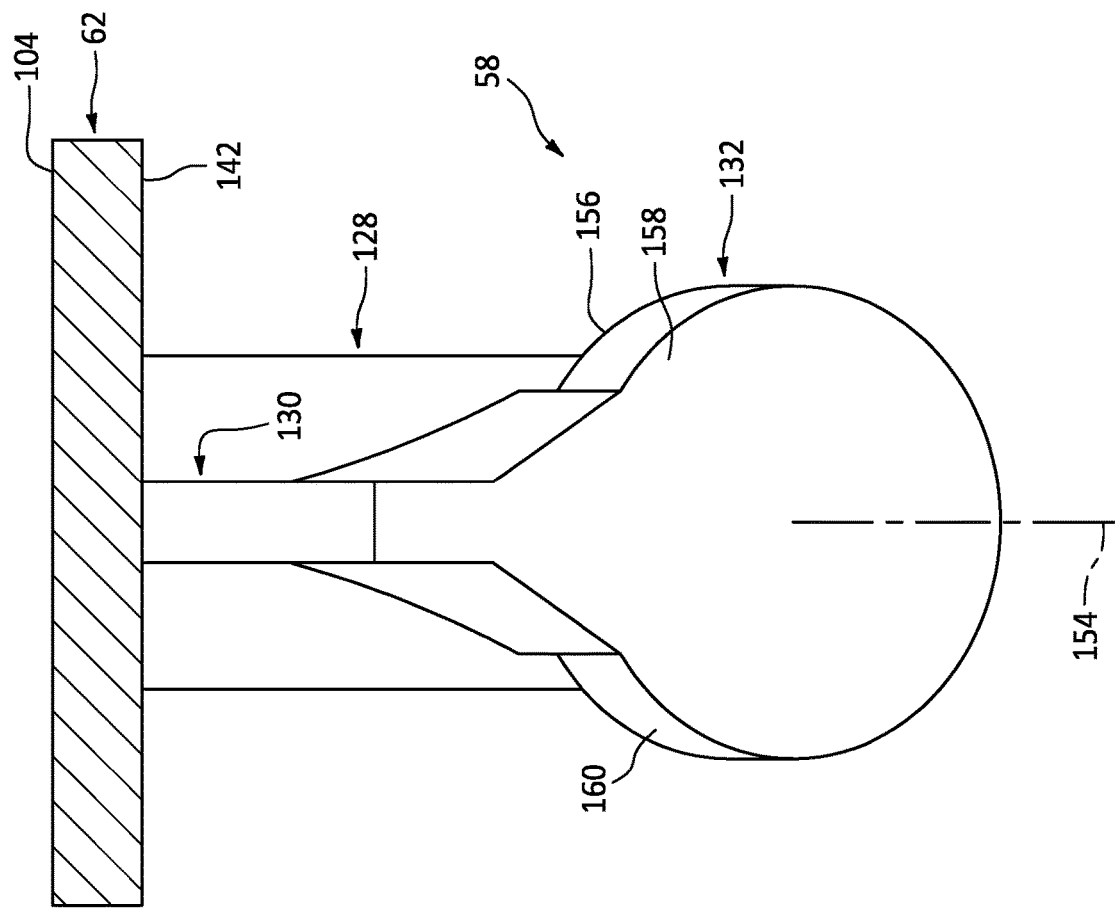
FIG. 9 is a perspective cutaway illustration of the turbine engine at the fuel injector.

The splash plate 132 of FIGS. 7 and 9 is configured with a (e.g., circular) puck-like body. The splash plate 132 of FIG. 7, for example, extends axially along a centerline axis 154 of the splash plate 132 between a frontside splash plate surface 156 and a backside splash plate surface 158, which backside splash plate surface 158 is axially opposite the frontside splash plate surface 156. Each of these splash plate surfaces 156, 158 may have a generally circular shape; e.g., see FIG. 9. However, in other embodiments, one or more of the splash plate surfaces 156, 158 may each have a non-circular (e.g., oval, polygonal, etc.) shape. Each of the splash plate surfaces 156, 158 may be configured as a smooth and/or planar surface. However, in other embodiments, one or more of the splash plate surfaces 156, 158 may each be configured as a non-planar (e.g., concave, convex, etc.) surface and/or with one or more flow disruptions; e.g., apertures or projections. The splash plate 132 of FIGS. 7 and 9 also includes at least one side perimeter surface 160 that extends axially between the opposing splash plate surfaces 156 and 158 and circumferentially about the centerline axis 154 of the splash plate 132.

Referring to FIG. 7, the splash plate 132 and, more particularly, its frontside splash plate surface 156 is angularly offset from the longitudinal centerline 146 by an angle 162 when viewed, for example, in a reference plane parallel with (e.g., that includes) the longitudinal centerline 146 of the nozzle passage 140 and/or the centerline axis 154 of the splash plate 132. The angle 162 may be an acute angle such as, but not limited to, between sixty degrees (60°) and eighty degrees (80°). The present disclosure, however, is not limited to such an exemplary arrangement. For example, in other embodiments, the angle 162 may be less than sixty degrees (60°) or more than eighty degrees (80°).

The splash plate 132 of FIGS. 7 and 9 is connected to the support member 130. In particular, in addition to supporting the nozzle tube 144, the support member 130 also forms a pylon for connecting the splash plate 132 to the fuel nozzle 128 and/or the case wall 62. Referring to FIG. 7, the splash plate 132 is disposed within and/or projects into the respective air passage 74. However, it is contemplated the splash plate 132 may alternatively be disposed just outside of the respective air tube 50B and its air passage 74.

The fuel circuit 134 of FIG. 7 includes the fuel supply passage 96 and one or more or all of the nozzle passages 140. The fuel circuit 134 may thereby deliver the fuel received from the fuel source 94 (see FIG. 2) to each fuel injector 58 for injection. More particularly, during turbine engine operation, the fuel is directed into the fuel supply passage 96 from the fuel source 94 (see FIG. 2). At least a portion (or all) of the fuel within the fuel supply passage 96 is directed into the nozzle passage 140. Referring to FIG. 8, this fuel flows through the nozzle passage 140 and out of the fuel nozzle 128 through the nozzle orifice 150 and into a spatial gap between the fuel nozzle 128 and the splash plate 132 as a fuel jet along a fuel jet trajectory 164, which may be parallel (e.g., coaxial) with the longitudinal centerline 146. This fuel jet may be a linear concentrated flow/stream of the fuel versus, for example, a spread-out pattern of fuel such as a conical film of fuel. The fuel jet flows through the spatial gap along its trajectory 164 and impacts (e.g., impinges against) the frontside splash plate surface 156 at a target area; e.g., an impingement area. Upon impacting the frontside splash plate surface 156, the splash plate 132 redirects (e.g., disperses) the impinging fuel jet radially outward (relative to the fuel jet trajectory 164) into a (e.g., uniform and/or symmetrical) radiant pattern; e.g., an arcuate and/or a generally planar film schematically shown in FIG. 7 via discrete flow arrows. The fuel may thereby be more evenly dispersed/spread/mixed into the compressed core air flowing past the fuel nozzle 128 and the splash plate 132 within the air passage 74. Providing such relatively even mixing of the fuel and the compressed core air may in turn increase fuel burn efficiency and/or reduce likelihood of carbon formation within the turbine engine 20.

Under certain conditions however, the combustion process may be temporarily starved of oxygen. For example, when starting (or restarting) the turbine engine 20 of FIG. 1 at high altitudes, the combustion process may initially be starved of oxygen until the compressor section 31 has time to spool up and provide the compressed core air. To facilitate turbine engine operation under such conditions, the gas circuit 136 of FIG. 7 is configured to deliver oxygen (e.g., oxygen ($O_2$) gas, or alternatively stored compressed air) to the combustor 46. Referring to FIGS. 2, 5 and 7, this gas circuit 136 includes the gas supply passage 108, the intermediate coupler 110 and the gas line 122. Referring to FIG. 7, the gas circuit 136 also includes one or more (e.g., oxygen ($O_2$)) gas passages 166, where each gas passage 166 may be configured with a respective one of the fuel injectors 58.

The gas passage 166 of FIG. 7 is formed by and is embedded within the support member 130 and the splash plate 132 of a respective fuel injector 58. The gas passage 166 of FIG. 7, for example, includes an upstream section 168 and a downstream section 170. The upstream section 168 of the gas passage 166 is fluidly coupled with and projects inward from the gas supply passage 108. The upstream section 168 of the gas passage 166 extends (e.g., radially and/or axially) through the support member 130 to the splash plate 132. The downstream section 170 of the gas passage 166 extends (e.g., radially and/or axially) through the splash plate 132 from the upstream section 168 of the gas passage 166 to a gas outlet 174 from the gas passage 166. The gas outlet 174 of FIG. 7 may be disposed in the side perimeter surface 160 and, thus, remote from the frontside splash plate surface 156 and/or the impinging fuel. The downstream section 170 of the gas passage 166 may also be configured to direct the gas out of the splash plate 132 through the gas outlet 174 and into the air passage 74 in a direction away from the fuel; see also FIG. 8. The downstream section 170 of the gas passage 166, for example, may direct the gas out of the gas outlet 174 into the air passage 74 in a direction that is parallel with the longitudinal centerline 76 (see FIG. 2) of the air tube 50B, or angularly offset from the longitudinal centerline 76 (see FIG. 2) by less than ten degrees (10°) or five degrees (5°). With this arrangement, the gas may be supplied to the air passage 74 relatively close (e.g., as close as possible) to the combustion chamber 48. Injecting the gas within the air passage 74 close to the combustion chamber 48 may facilitate provision of (e.g., all of) the gas to the combustion chamber 48 for combustion without being blocked, redirected or temporarily obstructed by, for example, the fuel dispersed by the splash plate 132.

In some embodiments, referring to FIG. 2, at least a portion of the static engine structure 36, which includes any one or more or all of the members 46, 58 and 62, may be formed in a monolithic body 176. Herein, the term "monolithic" may described a body which is additively manufactured, cast, machined and/or otherwise formed as a single unitary body. By contrast, a non-monolithic body may include multiple discretely formed bodies which are attached to one another following formation thereof. The present disclosure, however, is not limited to such an exemplary monolithic configuration nor to the foregoing exemplary manufacturing techniques.

Figure 10:
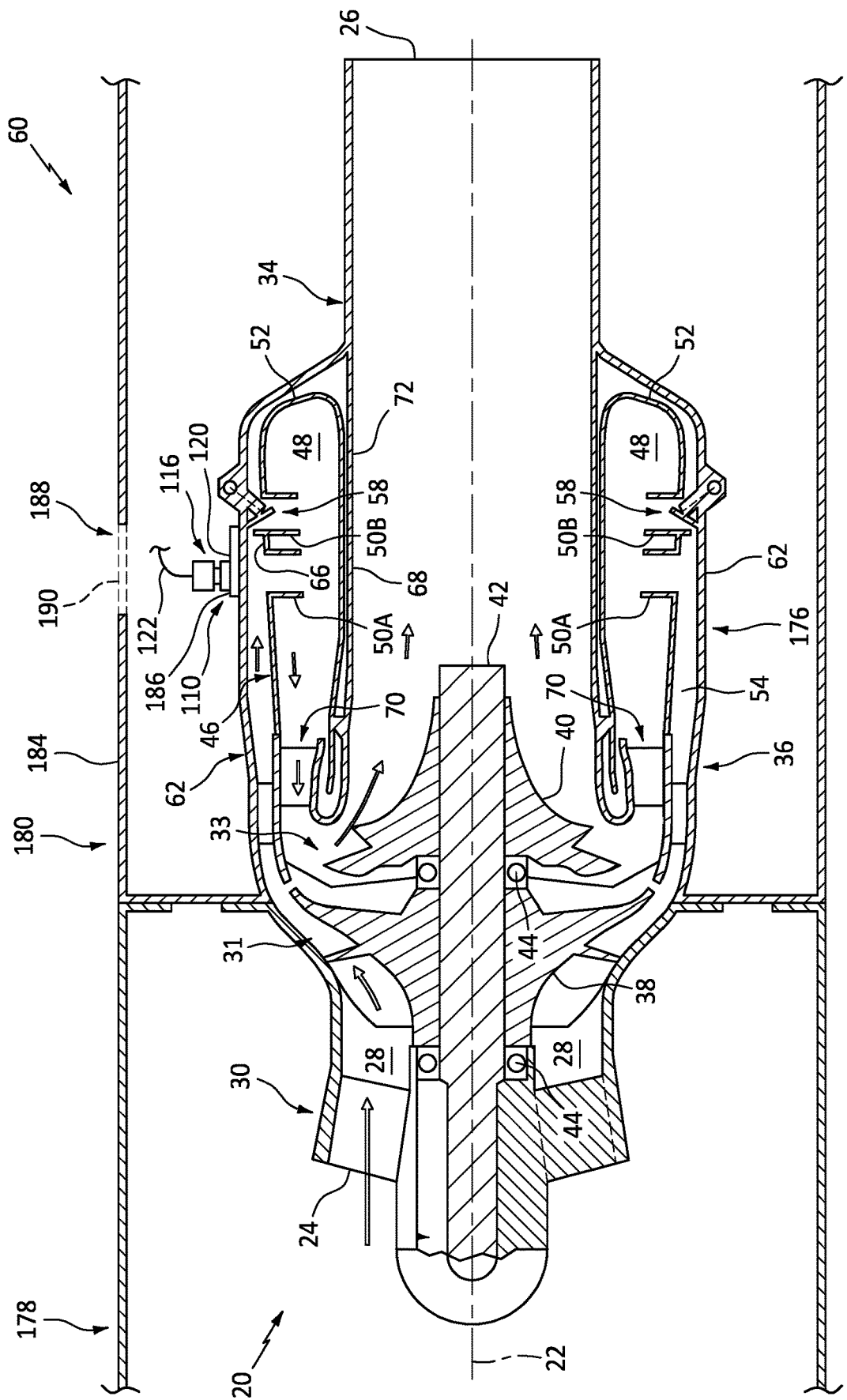
FIG. 10 is a schematic side sectional illustration of the turbine engine housed within a vehicle airframe.
Figure 11:
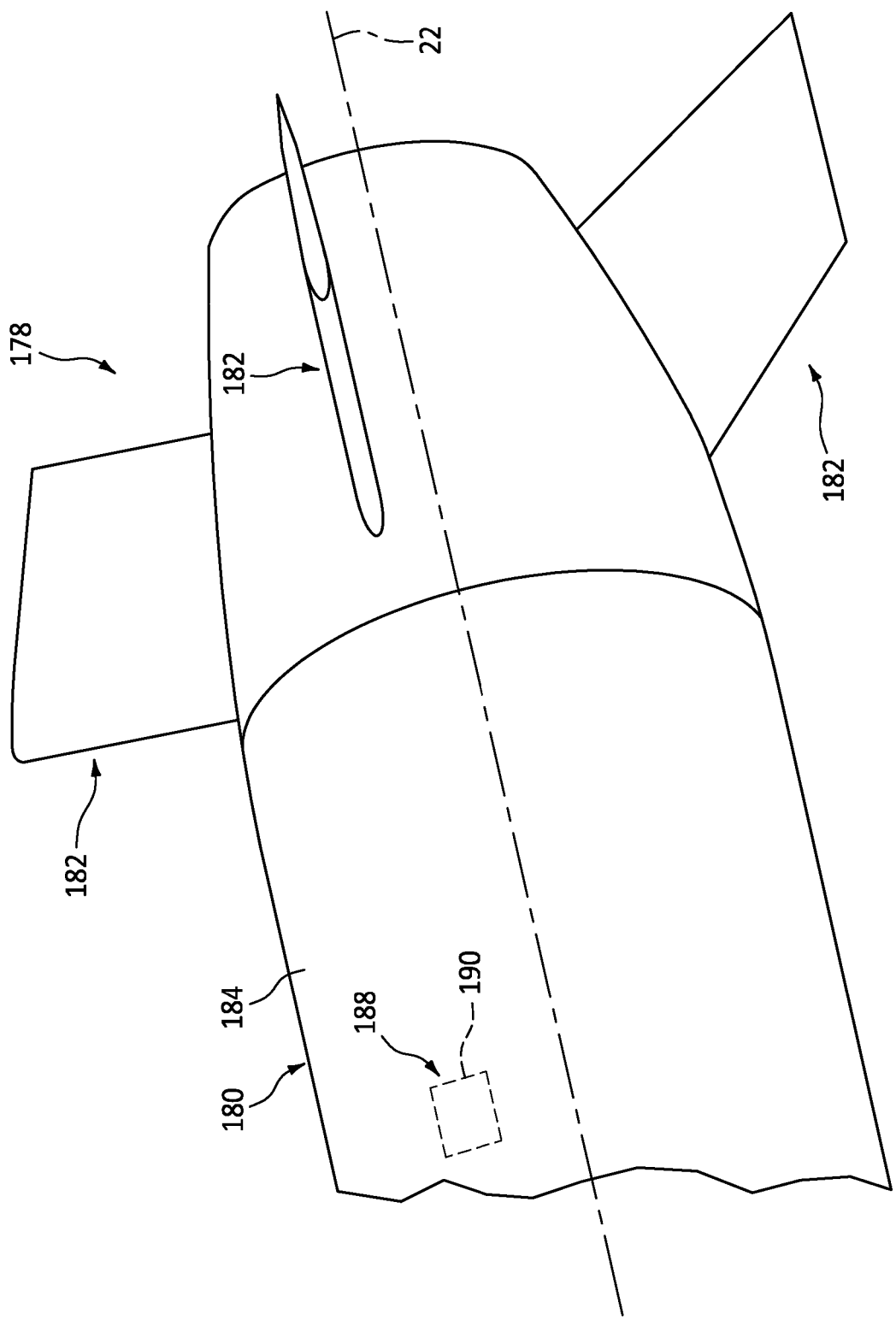
FIG. 11 is a partial perspective illustration of an exterior of the vehicle airframe.

Referring to FIGS. 10 and 11, the vehicle system 60 may also include a vehicle airframe 178. This vehicle airframe 178 may include an airframe body 180 and one or more airfoils 182 (e.g., wings, stabilizers, etc.) connected to and projecting outwards from the airframe body 180. Referring to FIG. 10, the turbine engine 20 may be arranged within and connected to the vehicle airframe 178. The turbine engine 20, for example, may be (e.g., completely) housed within the vehicle airframe 178 and its airframe body 180. The airframe body 180 may form an outer aerodynamic surface 184 for the aerial vehicle; see also FIG. 11. The airframe body 180, for example, may be configured as a nacelle for the turbine engine 20. The airframe body 180 may also or alternatively be configured as a fuselage and/or another airframe component for the aerial vehicle.

In some embodiments, referring to FIG. 10, at least a portion of the airframe body 180 may be formed integral with at least a portion of the static engine structure 36. At least a portion of the airframe body 180, for example, may be included in the monolithic body 176. In such embodiments, the airframe body 180 may block access to one or more locations on the case wall 62. To provide access to the mounting boss 120 for providing the mounting boss 120 with a flat mounting surface 186 (see also FIG. 5) to receive the gas line fitting 116, the airframe body 180 may be provided with an access port 188. This access port 188 projects (e.g., radially) through a sidewall of the airframe body 180. The access port 188 is positioned radially outboard of and (e.g., axially and/or circumferentially) overlaps the mounting boss 120 and/or the gas line fitting 116. With this configuration, a machining tool may be inserted through the access port 188 during manufacture to machine (e.g., plane) the mounting boss 120 and provide the mounting surface 186. However, during aerial vehicle operation, the access port 188 may be covered and closed using, for example, a cover panel 190 (see dashed line).

The vehicle system 60 may be configured with various turbine engines other than the one described above. The vehicle system 60, for example, may be configured with a geared turbine engine where a geartrain connects one or more shafts to one or more rotors in a fan section, a compressor section and/or any other engine section. Alternatively, the vehicle system 60 may be configured with a turbine engine configured without a geartrain; e.g., a direct drive turbine engine. The vehicle system 60 may be configured with a geared or non-geared turbine engine configured with a single spool (e.g., see FIG. 1), with two spools, or with more than two spools. The turbine engine may be configured as a turbofan engine, a turbojet engine, a propfan engine, a pusher fan engine or any other type of turbine engine. The present disclosure therefore is not limited to any particular types or configurations of turbine engines. The present disclosure is also not limited to a propulsion system application. For example, the gas turbine engine may alternatively be configured as an auxiliary power unit (APU) or an industrial gas turbine engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aerial vehicle, comprising:
a splash plate comprising a splash plate surface;
a fuel nozzle comprising a nozzle orifice, the fuel nozzle configured to direct fuel out of the nozzle orifice to impinge against the splash plate surface;
a gas circuit including a gas passage and a gas outlet, at least a portion of the gas passage formed by and embedded within the splash plate, and the gas passage extending through the splash plate to the gas outlet; and
a case wall extending axially along and circumferentially about an axial centerline;
the gas circuit further including a supply passage formed by and embedded within the case wall, the supply passage extending circumferentially about the axial centerline, and the gas passage fluidly coupled with and downstream of the supply passage.

2. The system of claim 1, further comprising:
a gas source fluidly coupled with the gas circuit;
the gas circuit configured to receive gas from the gas source, and the gas passage configured to direct the gas to the gas outlet.

3. The system of claim 2, wherein the gas source comprises a gas reservoir.

4. The system of claim 2, wherein the gas received by the gas circuit from the gas source is oxygen gas.

5. The system of claim 1, wherein
the splash plate further comprises a second surface; and
the gas outlet is disposed in the second surface.

6. The system of claim 1, wherein the gas circuit is configured to direct gas out of the gas outlet downstream of the splash plate surface.

7. The system of claim 1, wherein the gas circuit is configured to direct gas out of the gas outlet along a trajectory angularly offset from the splash plate surface and away from the fuel impinging against the splash plate surface.

8. The system of claim 1, further comprising:
an air tube including an air passage;
the fuel nozzle projecting into the air passage; and
the splash plate arranged within the air passage such that the splash plate is configured to direct at least some of the fuel against an inner sidewall surface of the air tube.

9. The system of claim 8, wherein the gas circuit is configured to direct gas out of the gas outlet into the air passage along a trajectory that is parallel with a centerline of the air tube or angularly offset from the centerline of the air tube by less than ten degrees.

10. The system of claim 8, further comprising:
a combustor wall at least partially forming a combustion chamber;
the air tube connected to the combustor wall and projecting into the combustion chamber.

11. The system of claim 1, wherein
the case wall comprises a boss; and
the gas circuit further includes a gas line fitting bonded to the boss, and the supply passage fluidly coupled with and downstream of the gas line fitting.

12. The system of claim 11, further comprising:
an airframe body comprising an access port; and
a turbine engine housed within the airframe body, the turbine engine including the splash plate, the fuel nozzle and the case wall;
the access port radially outboard of and overlapping the boss and the gas line fitting.

13. A system for an aerial vehicle, comprising:
a splash plate comprising a splash plate surface;
a fuel nozzle comprising a nozzle orifice, the fuel nozzle configured to direct fuel out of the nozzle orifice to impinge against the splash plate surface;
a gas circuit including a gas passage and a gas outlet, at least a portion of the gas passage formed by and embedded within the splash plate, and the gas passage extending through the splash plate to the gas outlet; and
a case wall and a support member;
the fuel nozzle connected to and projecting inward from the case wall;
the support member connected to and extending between the case wall and the fuel nozzle; and
the splash plate connected to the support member.

14. The system of claim 13, wherein
another portion of the gas passage is formed by and embedded within the support member; and
the gas passage extends though the support member from the case wall to the splash plate.

* * * * *